Patented June 17, 1941

2,246,095

UNITED STATES PATENT OFFICE 2,246,095

COATING COMPOSITION

Stuart Graves, Lansdowne, Pa., assignor to E. I. du Pont de Nemours & Company, Wilmington, Del., a corporation of Delaware No Drawing. Application December 16, 1937, Serial No. 180,246

4 Claims. (Cl. 260—39)

This invention relates to coating compositions and more particularly to synthetic resin enamels which are hard, tough and resistant to yellowing on baking and in service.

In the manufacture of enamels having as a vehicle oil modified polyhydric alcohol-polybasic acid resin, also referred to as alkyd resins, it has been proposed, in order to overcome the resistance to yellowing at medium or high temperatures, to use alkyd resins modified with fatty oil or oil acids having a low iodine number. Compositions of this kind are described in United States Patent 1,983,460. Although the toughness and water resistance of coatings produced from these enamels are satisfactory for most purposes, some improvements in these products have been desired. The urea-formaldehyde condensation products proposed for use are such as are normally prepared in aqueous solution and the water later replaced with organic solvents. Such products, however, are not satisfactory either alone or in conjunction with alkyd resins for producing enamels which are to be baked at medium or high temperatures. The combination of dimethylol urea with certain alkyd type resins has also been suggested but coatings made from such materials do not possess the hardness and toughness desired and those which are fairly satisfactory in these respects yellow objectionably on baking.

I have now discovered that when the alkyd resins described in the above mentioned patent are combined with the resinous reaction product obtained by chemically combining monohydric alcohol with urea-formaldehyde resins under special procedure, together with certain white pigments, that the resulting enamel is not only highly resistant to yellowing upon baking but also possesses additional properties which are highly desirable from an economic standpoint in that they are capable of being baked at lower temperatures or for shorter periods at high temperatures, and in that they are capable of tolerating larger quantities of pigment, and at the same time possess the requisite hardness, water resistance, and non-yellowing properties.

This invention has as an object the production of new and useful coating compositions and of new and useful baked enamel products. A further object is the provision of white and tinted baking enamels which are highly resistant to yellowing on baking at medium temperatures. A further object is the provision of white and tinted baking enamels which are highly water resistant, hard, tough and flexible. A still further object is the manufacture of baking enamels which will not lose their gloss on baking, will retain their gloss in service and will be highly resistant to yellowing in service. Other objects will be apparent as the description of the invention proceeds.

The above objects are accomplished by the following invention in which suitably pigmented coating compositions are formulated with vehicles comprising alkyd resins modified with low iodine number fatty oils or oil acids, and urea-formaldehyde resins containing chemically combined monohydric alcohol which are obtained in the manner more fully referred to below.

The oil modified alkyd resins as previously indicated are prepared by reacting fatty oils or oil acids having a low iodine number (preferably below 100) with polyhydric alcohol and polybasic acid. The use of fatty oils or of fatty oil acids having higher iodine numbers are not desirable since they tend to produce discoloration of the film in the baking operation and/or in service with the subsequent result of poor color stability in white and light tinted films. The alcoholysis method of preparing resins is usually the most satisfactory and comprises heating the fatty oil with the polyhydric alcohol (as glycerol) in the presence of an alcoholysis catalyst until the two liquid layers merge into a single layer and then heating the mono and/or diglycerides thus formed with the polybasic acid until resinification takes place. Other methods may also be used in preparing these resins as for example the solution method in which the ingredients are reacted in solution in a solvent for the resin but one which is immiscible with water and nonreactive with the ingredients and finished resin. If the fatty oil acids are used the fusion method of preparation may be used in which case the ingredients are heated together until the desired resinification takes place.

The iodine number of an oil acid, as is well known, is a measure of the degree of the chemical unsaturation of the material. Among such oils which are satisfactory as modifiers for the alkyd resin constituent of the composition of the present invention are castor oil (82-90), hydrogenated castor oil (less than 5), coconut oil (8-10), palm oil (48-58), palm kernel oil (16-23), and olive oil (74-94). The figures in parenthesis are the iodine numbers for the respective oils as given by Jamieson—Vegetable Fats and Oils—1932—Chemical Catalog Company, New York (with the exception of that for hydrogenated castor oil).

In addition to the above mentioned mixture of resins the vehicle in my improved coating compositions may contain free blown oil having a low iodine number in amounts of from 10% to 48% of the weight of the total vehicle.

The alkyd resin should contain the acid radicals of the low iodine number fatty oils or fatty oil acids in amount of from 35% to 65%, the higher oil substituted resins being more desirable when no free blown oil is included.

By urea-formaldehyde-monohydric alcohol is meant the resin described in U. S. Patent 2,191,957 and is prepared by reacting in the presence of an acid or other catalyst (mercuric, aluminum, ferric, or stannic chlorides, acid resins, halogens, etc.) ingredients consisting solely or essentially of urea, formaldehyde, and a monohydric aliphatic alcohol. The heating of the reaction product of the urea and formaldehyde with the alcohol is continued in the presence of a hydrocarbon such as benzene or toluene with separation of water of reaction from the condensed hydrocarbon and return of the latter to the reaction mixture until substantially two molecules of water for each molecule of urea are eliminated and a product is obtained which contains an amount of combined monohydric alcohol equivalent from one-half to about one molecule of alcohol for each molecule of urea. In accordance with this procedure a mixture containing all the ingredients may be reacted, or the alcohol may be heated, accompanied by the mentioned separation of water, with preformed urea-aldehyde reaction product. With the use of some alcohols it may not be necessary to use in addition a hydrocarbon since the water may be satisfactorily removed by other means, as for instance by the use of silica gel in the separator, or by the use of an auxiliary fractionating column to separate the water from the alcohol before the latter is returned to the reaction vessel. These resins yield upon treatment with zinc chloride and acetic anhydride the acetate of the alcohol.

The urea-formaldehyde-alcohol resin is preferably contained in the composition in an amount of from 25% to 60% of non-volatile vehicle.

The pigment used in the practice of this invention consists preponderately of white chemically inert pigments the most valuable of which is titanium oxide. The extended titanium oxide pigment, such as calcium base or barium base pigments, may also be used. Small amounts of other white pigments such as zinc oxide, white lead, zinc sulfide, zirconium oxide and beryllium carbonate may be added with the titanium pigment. When using a combination of the titanium pigment and other white pigment, usually zinc oxide, the preferred ratios of the titanium and zinc oxide pigments is between 95:5 and 90:10. Such ratio gives the optimum balance between color retention and hiding power. An increase in the zinc oxide content results in a slight improvement in resistance to yellowing in service but decreases the hiding power of the enamel. The use if desired of larger amounts of zinc oxide is therefore not precluded. Specially treated titanium dioxide, i. e. so treated as to minimize the yellowing tendency, is preferred in compositions containing no zinc oxide.

Colored pigments may be included in addition to the white pigment or pigment mixture mentioned above to produce tinted or pastel shade enamels. In fact the use of colored pigment to produce solid colors is not precluded. Although the after-yellowing in the case of solid colors is less apparent than in the case of lighter colors, there is nevertheless a departure from the true color after baking which will be prevented by the practice of this invention.

The titanium pigment or pigment mixture may be used in the compositions in amounts as large as 125% of the vehicle, that is of the resins or the resins plus free oil. This amount of pigment is considerably beyond that tolerated by the composition described in the patent previously referred to. I prefer to use not less than 75% of pigment based on the weight of the vehicle.

The following examples will more fully illustrate the method of carrying out my invention. The parts are by weight.

EXAMPLE I

*White baking enamel*

| | |
|---|---|
| Titanium dioxide | 29.1 |
| Zinc oxide | 1.9 |
| Urea - formaldehyde - monohydric alcohol resin (solids) | 14.4 |
| Oil modified polyhydric alcohol-polybasic acid resin | 9.5 |
| Isobutyl alcohol | 16.4 |
| Coal tar naphtha (xylol) | 15.7 |
| High solvency petroleum naphtha | 7.7 |
| Blown castor oil | 5.3 |

This composition was prepared by dispersing the titanium dioxide and zinc oxide in the urea-formaldehyde-monohydric alcohol resin and then adding the oil modified polyhydric alcohol-polybasic acid resin and the blown castor oil together with the solvents with vigorous agitation. The pigment may be dispersed by any of the known suitable means as by ball or pebble mill grinding, roller grinding, etc. The finished enamel had a solids content of 60.2%. The viscosity, however, is somewhat too high for satisfactory spraying so that it is desirable to reduce the solids content to approximately 50% for spraying purposes by the addition of the requisite amount of the hydrocarbon solvent mixture.

The polyhydric alcohol-polybasic acid resin used was a 55% castor oil modified glyceryl phthalate.

EXAMPLE II

| | |
|---|---|
| Titanium dioxide | 32.0 |
| Zinc oxide | 2.0 |
| Urea - formaldehyde - monohydric alcohol resin (solids) | 13.6 |
| Oil modified alkyd resin | 8.6 |
| Blown castor oil | 5.0 |
| Isobutyl alcohol | 17.0 |
| Coal tar naphtha (xylol) | 2.5 |
| High solvency petroleum naphtha | 19.4 |

This enamel may be prepared according to the procedure described under Example I. It differs from the enamel of the previous example in having a slightly higher pigment content. The alkyd resin used was the same as used in Example I.

EXAMPLE III

| | |
|---|---|
| Titanium dioxide | 31.4 |
| Urea - formaldehyde - monohydric alcohol resin (solids) | 10.5 |
| Oil modified alkyd resin (solids) | 18.0 |
| Isobutyl alcohol | 13.1 |
| Coal tar naphtha | 1.9 |
| High solvency petroleum naphtha | 25.3 |

This enamel may be prepared according to the procedure outlined in Example I. The composition differs from those of Examples I and II in containing a greater amount of oil modified alkyd resin and in containing no blown castor oil. The enamel further contains no zinc oxide. The alkyd resin used in the above composition was a 55% castor oil modified type. A 45% castor oil modified alkyd may be used with equally satisfactory results.

EXAMPLE IV

| | |
|---|---|
| Titanium dioxide | 31.4 |
| Urea - formaldehyde - monohydric alcohol resin (solids) | 10.5 |
| Oil modified alkyd resin (solids) | 18.0 |
| Isobutyl alcohol | 13.1 |
| Coal tar naphtha | 1.9 |
| High solvency petroleum naphtha | 25.3 |

The alkyd resin used in this composition is a 55% hydrogenated castor oil modified type. The enamel may be prepared as in the previous examples. If desired a 45% hydrogenated castor oil alkyd may be used in place of the 55% modification to obtain somewhat modified properties in the films produced. The choice of the oil modified alkyd to be used in the composition will as indicated be governed by the variation in particular properties desired in the films produced by the compositions and will be readily apparent to those skilled in the art or readily determined by simple trial.

It has been found that the preferred range of the three principal solid ingredients, exclusive of pigment, viz., urea-formaldehyde-monohydric alcohol resin, polyhydric alcohol-polybasic acid resin, and fatty oil, whether added as such or introduced as the modifier of the polyhydric alcohol-polybasic acid resin, is about as follows:

| | Per cent |
|---|---|
| Urea-formaldehyde-monohydric alcohol resin | 20 to 75 |
| Fatty oil | 20 to 48 |
| Polyhydric alcohol-polybasic acid resin | 20 to 45 |

The preferred pigment-vehicle ratio for the enamel compositions is 75/100 to 125/100. The lower ratios result in somewhat poorer hiding power and higher ratios have a tendency to reduce the gloss of the films produced.

In addition to phthalic acid, which is extensively used in the preparation of alkyd type resins, other polybasic acids as maleic, fumaric, adipic, pimelic, suberic, azelaic, sebacic, etc., may be used. Also in addition to glycerol other polyhydric alcohols may be used as the glycols either alone or in admixture with glycerol. The use of the higher polyhydric alcohols is also not precluded.

When blown oil is used the blown oil of the examples may be replaced by any blown oil having an iodine number within the range of the oil used to modify the polyhydric alcohol-polybasic acid resin.

The enamels of the present invention may be baked at a temperature range of from approximately 240° F. to approximately 350° F. for a time period of from approximately 5 minutes to approximately 125 minutes, such a baking schedule yielding films of approximately equal hardness. The baking schedule is not limited to this range as the permissible variations therefrom will be readily apparent to those skilled in the art. The rather short baking period at the higher temperature, however, is particularly advantageous from an economic standpoint.

This invention is particularly adapted for use in the manufacture of compositions used to produce decorative and protective coatings on such metal products as refrigerator cabinets, kitchen cabinets and other equipment, hospital furniture, bathroom fixtures, toys, bicycle frames, motor vehicle bodies and many other industrial uses where hardness, toughness, water resistance and, in the case of white composition, initial whiteness and retention of whiteness in service are of prime importance. The compositions are preferably applied by spraying although other suitable well known means of application may be used.

The compositions of the present invention produce coatings which are less sensitive to discoloration due to variations in baking temperature or baking time than enamels previously known. There is further appreciably less bleaching of the white enamels in strong sunlight, thus resulting in improved original whiteness and retention of whiteness in service. Greatly improved hardness and toughness of film together with high water resistance is shown by the baking enamels of the present invention. The present compositions, as has been mentioned, possess the advantage of being capable of being baked for short periods of time at high temperatures without causing the coating to exhibit yellowing. My improved enamels are also of increased industrial importance in that they tolerate larger quantities of pigment, thus making possible the application of fewer coats to obtain the desired white enameled surface.

As many apparently widely different embodiments of this invention may be made without departing from the spirit and scope thereof, it is to be understood that I do not limit myself to the specific embodiments thereof except as defined in the appended claims.

I claim:

1. An enamel yielding substantially non-yellowed films upon baking which comprises pigment consisting preponderately of titanium pigment, polyhydric alcohol-polybasic acid resin containing in substantial amount the acid radicals of fatty acid having an iodine number below 100, and urea-formaldehyde-monohydric alcohol resin containing said alcohol in combined form in amount from about one-half to about one molecule of alcohol for each molecule of urea and yielding upon treatment with zinc chloride and acetic anhydride the acetate of said alcohol, said pigment being present in amount of from 75% to 125% of the weight of the vehicle contained in said enamel.

2. The enamel set forth in claim 1 in which said polyhydric alcohol-polybasic acid resin contains from 35% to 65% of said acid radicals.

3. An enamel yielding substantially non-yellowed films which comprises pigment consisting preponderately of titanium pigment and nonvolatile vehicle consisting in substantial amount of a mixture of resins, one of said resins being a polyhydric alcohol-polybasic acid resin, containing from 35% to 65%, based on the weight of the resin, of the acid radicals of fatty acid having an iodine number below 100, the other of said resins being a urea-formaldehyde-monohydric alcohol resin containing said alcohol in combined form in amount from about one-half to about one molecule of alcohol for each molecule of urea and yielding upon treatment with zinc chloride and acetic anhydride the acetate of said alcohol, said last mentioned resin being present in an amount of from 25% to 60%, and said pigment being present in amount of from 75% to 125%, both of said amounts being based on the weight of the non-volatile vehicle contained in said enamel.

4. An enamel yielding substantially non-yellowed films which comprises pigment consisting preponderately of titanium pigment and non-volatile vehicle consisting essentially of blown fatty oil having an iodine number below 100 and a mixture of resins, one of said resins being a polyhydric alcohol-polybasic acid resin, containing from 35% to 65%, based on the weight of the resin, of the acid radicals of fatty acid having an iodine number below 100, the other of said resins being a urea-formaldehyde-monohydric alcohol resin containing said alcohol in combined form in amount from about one half to about one molecule of alcohol for each molecule of urea and yielding upon treatment with zinc chloride and acetic anhydride the acetate of said alcohol, said last mentioned resin being present in an amount of from 25% to 60%, and said blown fatty oil being present in amount of from 10% to 48% based on the weight of said resins.

STUART GRAVES.